US 8,125,971 B2

(12) United States Patent
Hammar

(10) Patent No.: US 8,125,971 B2
(45) Date of Patent: Feb. 28, 2012

(54) GENERIC PARALLEL SPREADING

(75) Inventor: Fredrik Hammar, Mölnlycke (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 613 days.

(21) Appl. No.: 12/278,202

(22) PCT Filed: Feb. 8, 2006

(86) PCT No.: PCT/IB2006/050405
§ 371 (c)(1),
(2), (4) Date: Mar. 27, 2009

(87) PCT Pub. No.: WO2007/091127
PCT Pub. Date: Aug. 16, 2007

(65) Prior Publication Data
US 2009/0310587 A1    Dec. 17, 2009

(51) Int. Cl.
*H04B 7/216* (2006.01)
(52) U.S. Cl. ......... 370/342; 370/320; 370/441; 370/479
(58) Field of Classification Search .................. 370/215, 370/335–338, 342, 347–350, 320–327, 441, 370/479
See application file for complete search history.

(56) References Cited

U.S. PATENT DOCUMENTS

| 2004/0174812 A1* | 9/2004 | Murakami et al. | 370/215 |
| 2005/0078651 A1* | 4/2005 | Lee et al. | 370/349 |
| 2006/0039331 A1* | 2/2006 | Abeta et al. | 370/335 |

* cited by examiner

*Primary Examiner* — Pao Sinkantarakorn
*Assistant Examiner* — Iqbal Zaidi
(74) *Attorney, Agent, or Firm* — Roger S. Burleigh

(57) ABSTRACT

Method for transmitting a wideband code division multiplex output signal at a given chip-rate corresponding to a plurality of combined physical radio links for respective user entities, comprising the steps of performing parallel symbol and code generation, parallel modulation, parallel spreading, each enhanced multiplex rate cycle providing a first number of parallel spread chip values, thus forming a first number of spread chip value streams. The enhanced multiplex rate being a second number greater than the chip rate of the output signal, combining the physical radio links over a number of segments corresponding to the second number at the enhanced multiplex rate in multiplex fashion, extending the combination of the physical radio links during a time corresponding to a third number of chips, causing a combined plurality of physical radio links, buffering the results so as to establish a complex signal at chip rate to the air transmission antenna.

7 Claims, 4 Drawing Sheets

| K | M (MODU-LATION TYPE) | CHANNEL BIT RATE (KBPS) | SF | BITS/ SLOT |
|---|---|---|---|---|
| 0 | 2 | 15 | 512 | 10 |
| 1 | | 30 | 256 | 20 |
| 2 | | 60 | 128 | 40 |
| 3 | | 120 | 64 | 80 |
| 4 | | 240 | 32 | 160 |
| 5 | | 480 | 16 | 320 |
| | 4 | 960 | 16 | 640 |
| | 6 | 1440 | 16 | 960 |
| 6 | 2 | 960 | 8 | 640 |
| 7 | | 1920 | 4 | 1280 |

GENERIC PARALLEL SPREADING

FIELD OF THE INVENTION

The present invention relates to WCDMA (wideband code division multiplex access) systems. More particular the invention relates to a method and an apparatus for performing downlink and spreading modulation.

BACKGROUND OF THE INVENTION

According to the European standardization body for 3G mobile telephony, the downlink and spreading modulation has been described in 3GPP TS 25.213 V6.2.0 chapter 5.

FIG. 1 is a reproduction from the above document showing the spreading and modulation principle. In SP, a downlink physical binary bit stream is serial to parallel converted in S/P stage and delivered to modulation and phase mapper, which again produce a mapping into the IQ plane of e.g. 16 QAM symbols. The symbols are spread by the high frequency mobile terminal specific channelization code $C_{ch,SF,m}$ and by a cell specific scrambling code $S_{dl,\,n}$, both signals having a duration of one chip.

A base station unit must at least perform downlink transmission relating to a number of bit streams on a plurality of physical channels (e.g. 512 channels), relating for instance to individual mobile users. The information on the downlink channels are spread and modulated according to the above method and added such that one output signal is amplified and transmitted by the base station antenna.

One approach for performing this task is to provide modulation and spreading resources per physical channel, whereby each modulation and spreading resource performs spreading of the bit stream pertaining to the channel in question.

SUMMARY OF THE INVENTION

The invention seeks to provide method and an apparatus performing spreading and modulation for a number of channel streams at a reduced hardware complexity. This object has been achieved by a method for transmitting a wideband code division multiplex (WCDMA) output signal (OUT) at a given chip-rate ($F_{CS}$) corresponding to a plurality (L) of combined physical radio links (PHCH#0-PHCH#511) for respective user entities, comprising the steps of performing parallel symbol and code generation, parallel modulation, parallel spreading, each $F_{MUX}$ cycle providing a first number (P; 16) of parallel spread chip values, thus forming a first (P) number of spread chip value streams, all at an enhanced multiplex rate ($F_{MUX}$), the enhanced multiplex rate being a second number (M; 32) greater than the chip rate ($F_{CS}$) of the output signal (OUT) to be transmitted, combining the physical radio links over a number of segments (RS#1-RS#M; M) corresponding to the second number (M; 32) at the enhanced multiplex rate in multiplex fashion, extending the combination of the physical radio links during a time corresponding to a third number (N; 16) of chips, causing a combined plurality of (L; 512) physical radio links, and buffering the results so as to establish a complex signal at chip rate ($F_{CS}$) to the air transmission antenna.

According to the invention there is moreover provided a radio base station unit (BS) for transmitting a wideband code division multiplex (WCDMA) output signal (OUT) at a given chip-rate ($F_{CS}$) corresponding to a plurality (L) of combined physical radio links (PHCH#0-PHCH#511) for respective user entities comprising a memory area (4) comprising data streams (DS) of at least payload data to be transmitted of the physical radio links (PHCH#0-PHCH#511), a first group (G) of symbol and code generators (5) and a second group (G) of modulation and phase mappers (6), performing serial to parallel conversion mapping of selected data streams (DATA) for the generation of complex symbols (SY), a third group (G) of spreading units (7) for spreading complex symbols (SY) according to specific spreading code products (CPI) corresponding to predetermined channelization and scrambling codes ($C_{ch,\,SF,\,m}*S_{dl,n}$), and an adder (8) comprising buffering means (9) for providing the at least one output signal (OUT), corresponding to combination/accumulation in time over the multiplexed physical radio links, the output signal being provided to at least one antenna port at the given chip-rate ($F_{CS}$).

Further advantages will appear from the following detailed description of the invention.

DETAILED DESCRIPTION OF PREFERRED EMBODIMENTS OF THE INVENTION

Figure 3:
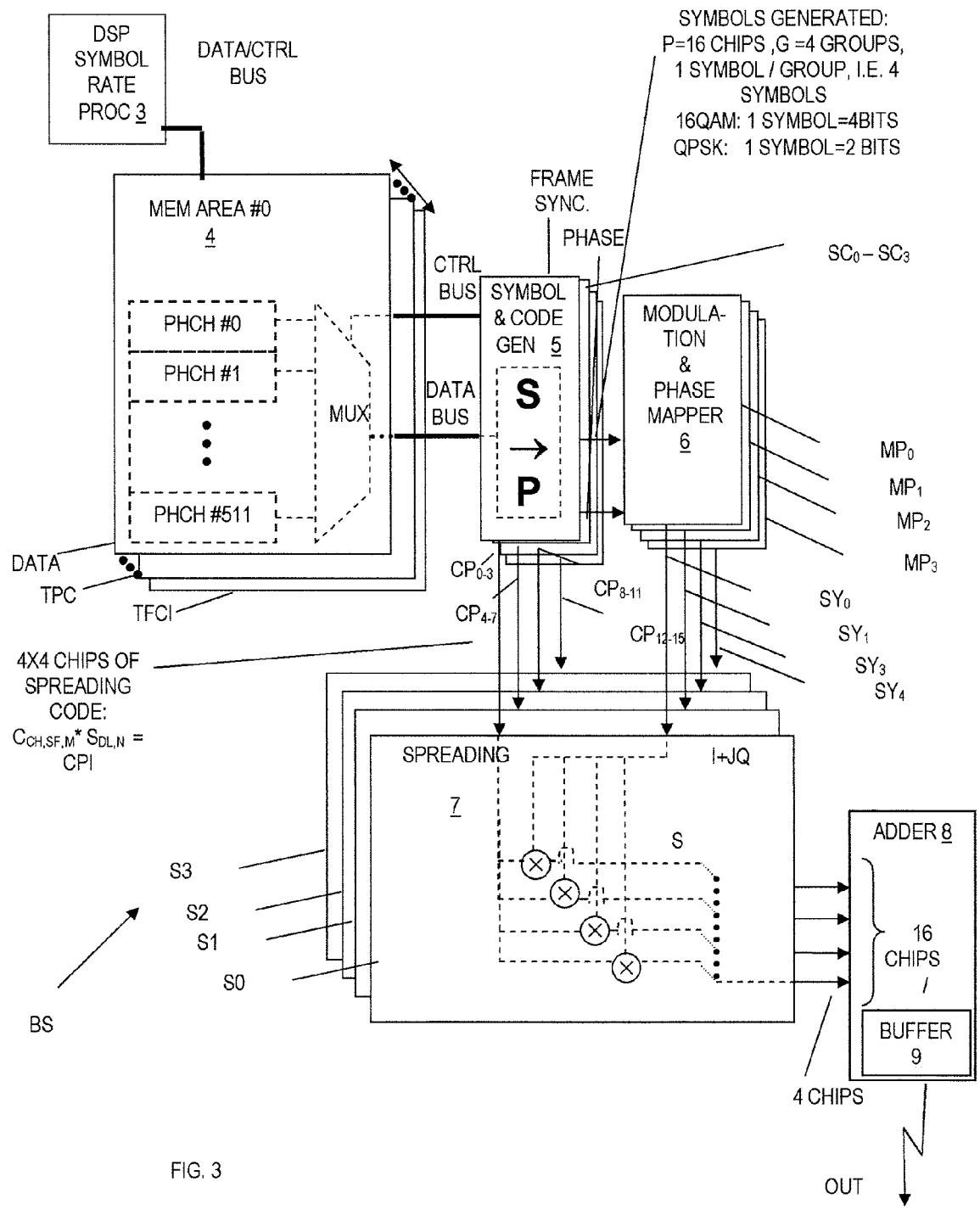
FIG. 3 shows a first preferred embodiment of the invention.

In FIG. 3, a radio base station unit (BS) according to a preferred embodiment of the invention has been shown. The radio base station unit (BS) transmits a wideband code division multiplex (WCDMA) output signal (OUT) at a given chip-rate ($F_{CS}$) corresponding to a combined plurality (L) of physical radio links (PHCH#0-PHCH#511) for respective user entities, also denoted mobile stations.

The unit comprises a plurality of RAM memory areas 4 adapted for storing in memory locations payload and control data and radio specific binary bit streams, denoted PHCH#0-PHCH#511, for instance relating to specific mobile data users. Each memory area comprises moreover a multiplexing unit MUX for selectively reading from one of the above-mentioned memory locations. The memory areas may be arranged so that data information related to the bit streams to be transferred is provided on one board, transmit power control (TPC) information on a second board and transport format combination indicator (TFCI), relating to the bit streams to be transmitted is arranged on a third board. Additionally pilot information, slot format and various code information is made available on the memory areas.

The base station unit (BS) moreover comprises a DSP (digital signaling processor) symbol rate processor 3 is provided, which over a Data/control bus transfers data and control information to the memory area 4 from external units (not shown).

A symbol and code generator, 5, performs a serial to parallel conversion mapping of selected data streams for the first stage of generation n-QAM (including QPSK) coded complex symbols, as characterized by an amplitude value and a phase value. The symbol and code generator moreover transports pre-stored specific spreading code products, CPi corresponding to the scrambling and channelization codes specific for corresponding data streams PhCH#0-PhCH#511, and provides the spreading code products on respective ports CPi. According to a preferred embodiment of the invention, The symbols to be generated could advantageously pertain to 16 QAM (quaternary amplitude modulation), 64 QAM or QPSK (quaternary phase shift keying) symbols. According to a preferred embodiment of the invention, combination (i.e. addition) over physical radio links are performed during an interval of N_chips, N_chips=16, chip sequences (CS) at a time. Note that addition is not performed over chip values within the same physical radio link due to the orthogonality in WCDMA.

A plurality of modulation and phase mappers 6, $MP_0$, $MP_1$, $MP_2$, $MP_3$ are provided for performing final coding into n-QAM coded complex symbols, S.

Figures 1, 2:
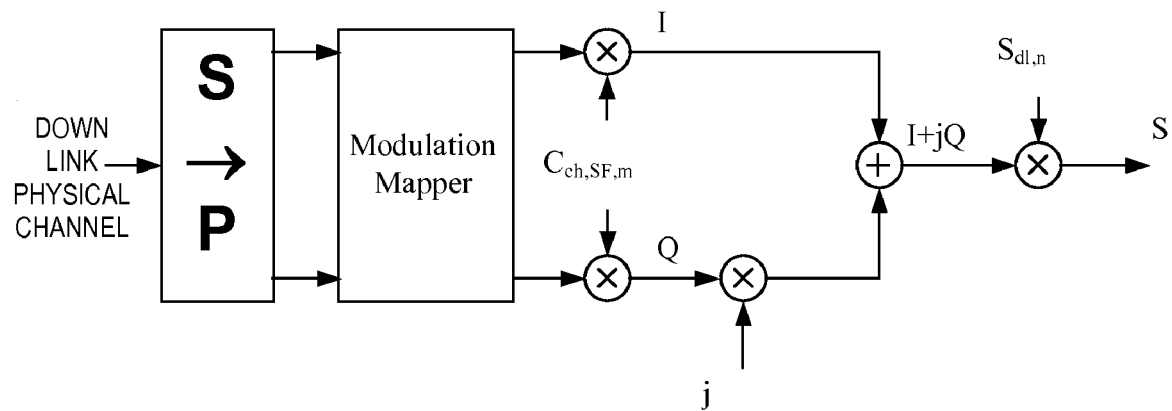
FIG. 1 shows a prior art transmitter, comprising a modulation-mapper, a channelization coder and a spreading unit.
FIG. 2 shows a table of modulation types and spreading formats to be used for preferred embodiments of the invention.

Modulation symbols for a physical channel are divided onto each slot according to 3GPP TS 25.213 V5.3.0, see table of FIG. 2.

The channel bit rates for all physical channels are given in the table of FIG. 2. MOD corresponds to the number of bits per modulation symbols i.e. MOD=2 for QPSK, MOD=4 for 16 QAM and MOD=6 for 64QAM.

Figure 4:
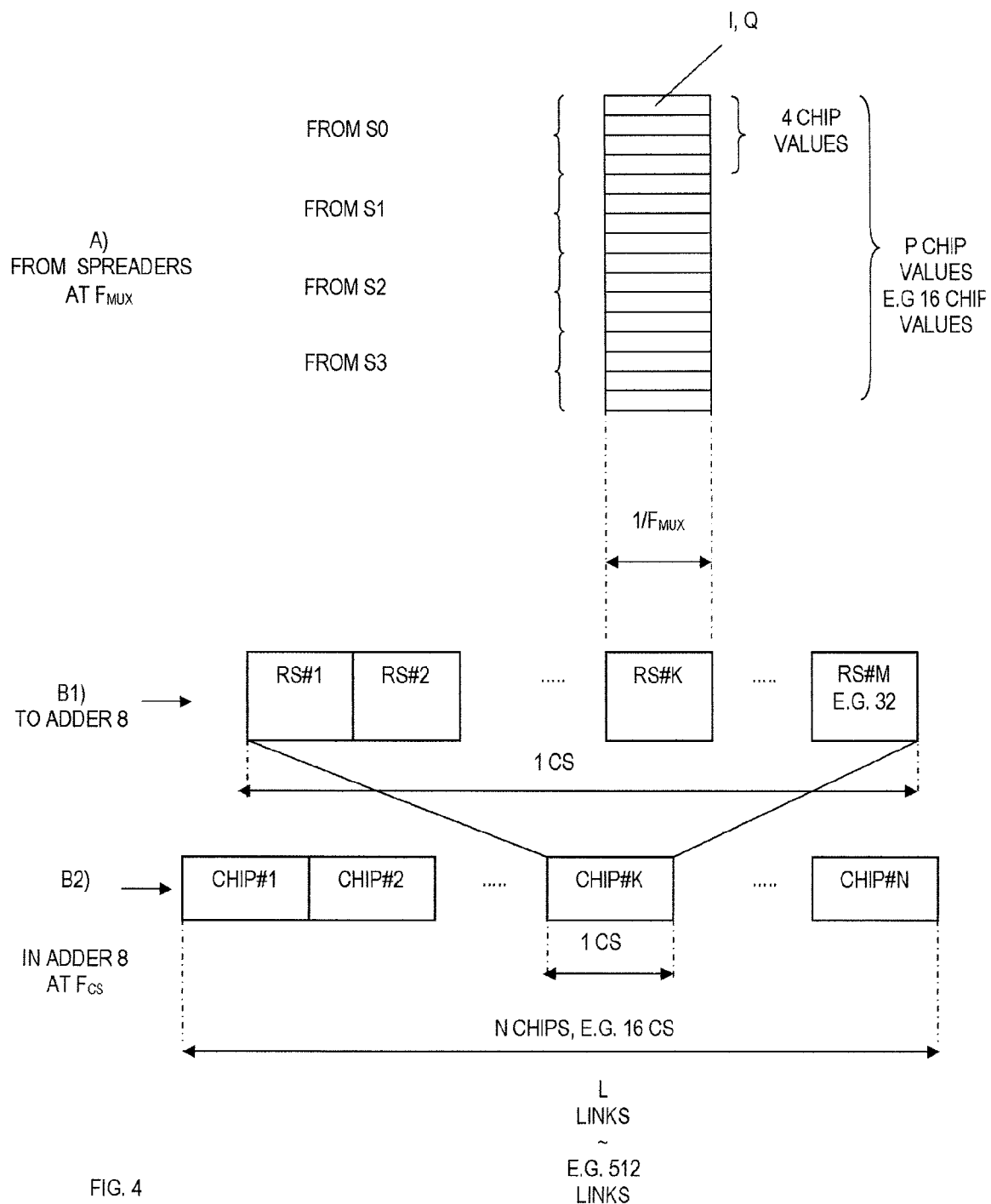
FIG. 4 is a first timing diagram according to the invention.
Figure 5:
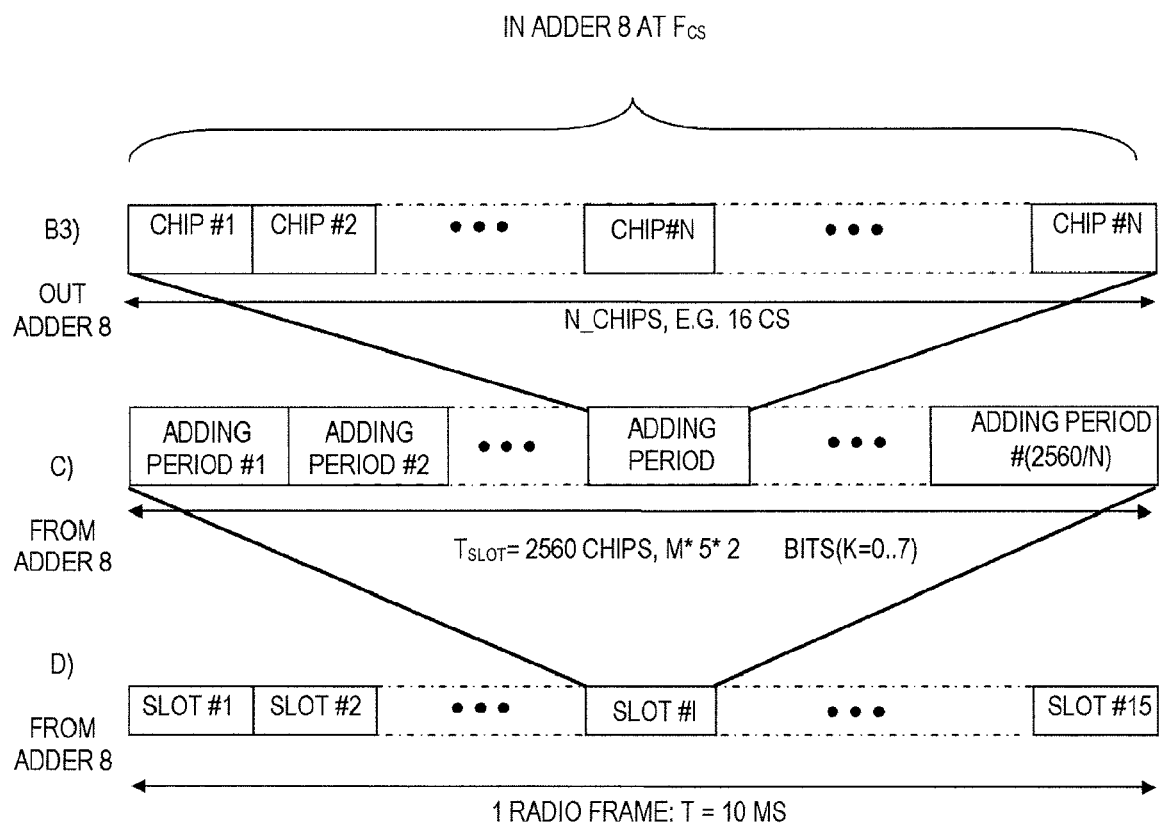
FIG. 5 is a second timing diagram according to the invention.

The general frame, slot and chip structure that is the basis for the generic parallel spreading of all physical channels are shown on FIGS. 4 and 5.

Each frame of length 10 ms is split into 15 slots, each of length $T_{slot}$=2560 chips.

The parameter k in FIG. 2 determines the total number of modulation symbols per slot. It is related to the spreading factor SF of the physical channel as SF=512/$2^k$. The spreading factor may thus range from 512 down to 4.

The exact number of bits of the different downlink physical channel fields ($N_{pilot}$, $N_{TPC}$, $N_{TFCI}$, $N_{data1}$ and $N_{data2}$) is specified in the 3GPP standard. The actual slot format to use is configured by higher layers.

Hence, a plurality of spreading units 7 is moreover provided for spreading the n-QAM/QPSK modulated signals in frequency, according to the direct sequence spread spectrum-coding principles, for instance using the chip sequence rate Advantageously, the number of symbol and code generators 5, the number of modulation and phase mappers, 6, and the number of spreading units, SP 7 ($N_{GROUP}$) is the same, namely four.

Each spreading unit combines associated values of coding product and n-QAM coded symbol. For instance, in spreading unit S0, spreading code $CP_{0-3}$ and symbol $SY_0$ is combined to spread the n-QAM coded symbol in frequency in a manner, which is well known in the art.

Hence, a first group (G) of symbol and code generators (5) and a second group (G) of modulation and phase mappers (6), are performing serial to parallel conversion mapping of selected data streams (DATA) for the generation of complex symbols (SY), a third group (G) of spreading units (7) for spreading complex symbols (SY) according to specific spreading code products (CPI) corresponding to predetermined channelization and scrambling codes ($C_{ch,SF,m}*S_{dl,n}$). Thereby, a number of complex samples (I, Q)/chips are provided on the output of each spreading unit.

The base station BS furthermore comprises an adder (8) comprising buffering means (9) for providing the at least one output signal (OUT) of combined (added) physical radio links, the output signal being provided to at least one antenna port at the given chip-rate ($F_{CS}$).

The spreaded chips are combined in adder 8 and transmitted on the air interface, in a manner, which shall be explained in the following.

In FIGS. 4 and 5 the timing properties for the transmitter according to the invention are disclosed.

As appears from FIG. 4, the radio base station unit is reading data from the memory area (4) into the ($N_{GROUP}$=4) symbol and code generators ($S_0$-$S_3$) at an enhanced multiplex rate ($f_{MUX}$).

According to a preferred embodiment of the invention, the following steps are carried out by the base station unit:

A) performing parallel symbol and code generation, parallel modulation, parallel spreading, each $F_{MUX}$ cycle providing a first number (P; 16) of parallel spread chip values, thus forming P number of spread chip value streams, all at an enhanced multiplex rate ($F_{MUX}$), the enhanced multiplex rate being a second number (M; 32) greater than the chip rate ($F_{CS}$) of the output signal (OUT) to be transmitted.

B1) the adder (8) has the input of P number of parallel spread chip value streams and the adder combines/accumulates each such spread chip value stream over the M multiplexed radio link physical channels. One CS is divided upon (M; 32) number of segments (RS#1-RS#M; M) at the enhanced multiplex rate in multiplex fashion.

B2) the adder extends accumulation over (N; 16) chips, i.e. 16 CS. Thus each period of N chips there is to be P number of combined chip values buffered and generated totally over (L; 512) physical radio links.

B3) The adder as a final step shifts out the buffered P parallel combined chip values into a serial chip rate ($F_{CS}$) flow, during N chips, directed to an air transmission antenna. This shifting-out step is carried out simultaneously with the ordinary adding function during N chips to form the adding period of N chips.

Turning now to FIG. 5, in a wider perspective, according to a further step C), the P accumulation functions is restarted every adding period (ADDING PERIOD), chips of adding periods being sequentially transmitted so as to form a slot period (SLOT#I)

According to step D), chips of slot periods are being sequentially transmitted so as to form a slot period in a radio frame (T).

The number of units in the first (5), second (6), and third (7) groups may be equal. Moreover, as shown in the above example the number of units in each of the first (5), second (6), and third (7) groups amounts to four.

The invention claimed is:

1. A radio base station for transmitting a wideband code division multiplex (WCDMA) output signal at a given chip-rate corresponding to a plurality of combined physical radio links for respective user entities, comprising:
   a memory area for storing data streams of at least payload data to be transmitted of the physical radio links;
   a first group of symbol and code generators;
   a second group of modulation and phase mappers, the first group of symbol and code generators and second group of modulation and phase mappers operable to performing serial to parallel conversion mapping of selected data streams for the generation of complex symbols;
   a third group of spreading units for spreading complex symbols according to specific spreading code products corresponding to predetermined channelization and scrambling codes;
   an adder having a buffering means for providing at least one output signal, corresponding to combination/accumulation in time over the multiplexed physical radio links, the at least one output signal being provided to at least one antenna port at the given chip-rate;

means for performing parallel symbol and code generation, parallel modulation, parallel spreading wherein each enhanced multiplex rate cycle provides a first number of parallel spread chip values, thus forming a first number of spread chip value streams, all at an enhanced multiplex rate, the enhanced multiplex rate being a second number greater than the chip rate of the output signal to be transmitted;

means for combining the physical radio links over a number of segments corresponding to the second number at the enhanced multiplex rate in multiplex fashion;

means for extending the combination of the physical radio links during a time corresponding to a third number of chips, causing a combined plurality of physical radio links; and, means for buffering the results so as to establish a complex signal at chip rate to the air transmission antenna.

2. The radio base station according to claim 1, wherein the adding is restarted every adding period, chips of adding periods being sequentially transmitted so as to form a slot period, and wherein chips of slot periods are sequentially transmitted so as to form a slot period in a radio frame.

3. The radio base station according to claim 1, wherein the number of parallel spread chips is a multiple of the smallest spreading factor.

4. The radio base station according to claim 1, wherein all the physical radio links are time-multiplexed within a time period that is a number of chips wide, whereby a first number marks the adding period that is equal to the second number that marks the number of parallel spread chips.

5. The radio base station according to claim 1, wherein the maximum number of spreadable physical radio links is the product of a first number and the second number.

6. A method for transmitting a wideband code division multiplex (VVCDMA) output signal at a given chip-rate corresponding to a plurality of combined physical radio links for respective user entities, comprising the steps of:

performing parallel symbol and code generation, parallel modulation, parallel spreading, each enhanced multiplex rate cycle providing a first number of parallel spread chip values, thus forming a first number of spread chip value streams, all at an enhanced multiplex rate, the enhanced multiplex rate being a second number greater than the chip rate of the output signal to be transmitted;

combining the physical radio links over a number of segments corresponding to the second number at the enhanced multiplex rate in multiplex fashion;

extending the combination of the physical radio links during a time corresponding to a third number of chips, causing a combined plurality of physical radio links; and buffering the results so as to establish a complex signal at chip rate to the air transmission antenna.

7. The method according to claim 6, wherein the adding is restarted every adding period, chips of adding periods being sequentially transmitted so as to form a slot period, and wherein chips of slot periods being sequentially transmitted so as to form a slot period in a radio frame.

* * * * *